(12) United States Patent
Kouno

(10) Patent No.: US 8,009,974 B2
(45) Date of Patent: Aug. 30, 2011

(54) POWER TRANSMISSION AND CAMERA

(75) Inventor: Yousuke Kouno, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/707,136

(22) Filed: Feb. 16, 2007

(65) Prior Publication Data

US 2007/0209459 A1    Sep. 13, 2007

(30) Foreign Application Priority Data

Feb. 20, 2006  (JP) ................................ 2006-042455

(51) Int. Cl.
*G02B 7/04*  (2006.01)

(52) U.S. Cl. .......... 396/83; 359/694; 359/696; 359/823; 359/827; 74/89.23; 74/424.71; 74/424.78

(58) Field of Classification Search ............... 74/424.94, 74/424.96, 424.78, 89.23, 89.36, 89.37, 89.39, 74/424.79; 359/694–701; 396/55, 83, 144

See application file for complete search history.

(56) References Cited

U.S. PATENT DOCUMENTS

| | | | | |
|---|---|---|---|---|
| 2,893,276 A | * | 7/1959 | Quackenbush | ................ 74/841 |
| 3,815,434 A | * | 6/1974 | Seger | ........................ 74/424.79 |
| 4,023,431 A | * | 5/1977 | Pavlas | ........................ 74/424.94 |
| 5,150,260 A | | 9/1992 | Chigira | |
| 5,377,048 A | * | 12/1994 | Tada et al. | .................... 359/823 |
| 5,391,866 A | * | 2/1995 | Hoshino et al. | ............ 250/201.2 |
| 5,748,394 A | * | 5/1998 | Shimazaki et al. | .......... 359/823 |
| 6,292,308 B1 | * | 9/2001 | Tsuzuki et al. | .............. 359/704 |
| 6,654,557 B2 | | 11/2003 | Kikuchi | |
| 7,474,845 B2 | * | 1/2009 | Hayashi et al. | ................ 396/85 |
| 2006/0002696 A1 | * | 1/2006 | Onishi et al. | ................... 396/85 |

FOREIGN PATENT DOCUMENTS

| | | |
|---|---|---|
| DE | 101 60 587 | 6/2003 |
| DE | 101 60 587 A1 | 6/2003 |
| JP | 2-71155 | 5/1990 |
| JP | 4-46307 | 2/1992 |
| JP | 5-325439 | 12/1993 |
| JP | 6-308361 | 11/1994 |
| JP | 8-122611 | 5/1996 |
| JP | 2001-356257 | 12/2001 |
| JP | 2002-162555 | 6/2002 |
| JP | 2004-63003 | 2/2004 |
| JP | 2005-43733 | 2/2005 |
| JP | 2005-148263 | 6/2005 |

OTHER PUBLICATIONS

Extended European Search Report issued in corresponding European Patent Application No. 07290195.2, on Jun. 14, 2007.
English language translation of DE 101 60 587 A1.
Office Acton mailed form the Japanese Patent Office on Feb. 15, 2011 in the related Japanese patent application No. 2006-042455.

* cited by examiner

*Primary Examiner* — James Pilkington
*Assistant Examiner* — Thomas Diaz

(57) ABSTRACT

A power transmission capable of regulating the disengagement of a nut part from a screw part, and the like are provided. The power transmission is constructed of a rotation shaft having a thread formed on a periphery thereof; a nut member capable of being opened and closed, the nut member having a thread engaged with the thread of the rotation shaft, and pinching the rotation shaft and moving as the rotation shaft is rotated; a regulating part enabling movement of the nut member by regulating opening of the nut member; and a regulation releasing part capable of releasing engagement between the nut member and the rotation shaft by opening the nut member.

22 Claims, 10 Drawing Sheets

POWER TRANSMISSION AND CAMERA

The disclosure of the following priority application is herein incorporated by reference: Japanese Patent Application No. 2006-042455 filed on Feb. 20, 2006.

BACKGROUND OF THE INVENTION

1. Field of the Invention

The present invention relates to a power transmission and a camera provided with the power transmission.

2. Description of Related Art

It is known that an imaging lens barrel of a camera includes a drive mechanism adapted to drive a lens frame for holding part of the lenses in an optical axis direction by using a motor shaft having a feed screw formed on the outer peripheral surface thereof and a notched nut engaged with the motor shaft (for example, refer to Japanese Patent No. 2890689).

The abovementioned drive mechanism has a release function that releases the engagement with the feed screw by the opening of the notched nut when an excessive force is applied, in order to protect the power transmission in the event of a malfunction in control.

However, in cases where the abovementioned drive mechanism is used in a camera or the like, the abovementioned release function may operate to release the engagement of the notched nut by the shock exerted when it is put on, for example, a table (especially, by inertial force to the optical axis direction).

SUMMARY OF THE INVENTION

An object of the present invention is to provide a power transmission capable of regulating the disengagement of a nut part from a threaded part, as well as a camera provided with the power transmission.

The present invention solves the foregoing problem by the following means.

In accordance with a first aspect of the present invention, a power transmission includes: a rotation shaft having a thread formed on an outer periphery thereof; a nut member capable of being opened and closed, the nut member having a thread engaged with the thread of the rotation shaft, and pinching the rotation shaft and moving as the rotation shaft is rotated; a regulating part enabling movement of the nut member by regulating opening of the nut member; and a regulation releasing part capable of releasing engagement between the nut member and the rotation shaft by opening the nut member.

In the power transmission in accordance with the first aspect of the present invention, the regulation releasing part may release the engagement between the nut member and the rotation shaft by opening the nut member when a force of at least a predetermined value is applied between the thread of the nut member and the thread of the rotation shaft.

The power transmission in accordance with the first aspect of the present invention may further include a guide member provided with the regulating part and the regulation releasing part.

In the abovementioned power transmission, the guide member may be arranged substantially parallel to the rotation shaft.

In the abovementioned power transmission, the regulation releasing part may release the engagement between the nut member and the rotation shaft by opening the nut member when a force of at least a predetermined value is applied between the thread of the nut member and the thread of the rotation shaft.

In the abovementioned power transmission, the regulating part may be formed in a range of the guide member corresponding to a moving range of the nut member, and the regulation releasing part is formed in a range of the guide member corresponding to outside the moving range of the nut member.

In the abovementioned power transmission, the regulating part may be a surface opposed to the nut member, and regulating the opening of the nut member so as not to release the engagement between the thread of the rotation shaft and the thread of the nut member, and the regulation releasing part is a recess or an opening opposed to the nut member, and opening the nut member so as to release the engagement between the thread of the rotation shaft and the thread of the nut member.

In the abovementioned power transmission, the nut member may have a projection smaller than the recess or the opening at a position opposed to the guide member.

In the abovementioned power transmission, the regulating part may be formed in a range of the guide member corresponding to a moving range of the nut member, and the regulation releasing part is formed in a range of the guide member corresponding to outside the moving range of the nut member.

In accordance with a second aspect of the present invention, a camera includes: a power transmission having a rotation shaft having a thread on a periphery thereof; a nut member capable of being opened and closed, the nut member having a thread engaged with the thread of the rotation shaft, and pinching the rotation shaft and moving as the rotation shaft is rotated; a regulating part enabling movement of the nut member by regulating opening of the nut member; and a regulation releasing part capable of releasing engagement between the nut member and the rotation shaft by opening the nut member; an actuator to rotate the rotation shaft of the power transmission; and a movable lens connected to the nut member of the power transmission.

In accordance with the camera of the second aspect of the present invention, the regulation releasing part may release the engagement between the nut member and the rotation shaft by opening the nut member when a force of at least a predetermined value is applied between the thread of the nut member and the thread of the rotation shaft.

In accordance with the camera of the second aspect of the present invention, the power transmission may have a guide member provided with the regulating part and the regulation releasing part each being arranged parallel to the rotation shaft, the regulating part is formed in a range of the guide member corresponding to a moving range of the nut member, and the regulation releasing part is formed in a range of the guide member corresponding to outside the moving range of the nut member.

In accordance with the abovementioned camera, the regulating part is a surface opposed to the nut member and regulating the opening of the nut member so as not to release the engagement between the thread of the rotation shaft and the thread of the nut member, the regulation releasing part is a recess or an opening opposed to the nut member and opening the nut member so as to release the engagement between the thread of the rotation shaft and the thread of the nut member, and the regulation releasing part releases the engagement between the nut member and the rotation shaft by opening the nut member when a force of at least a predetermined value is applied between the thread of the nut member and the thread of the rotation shaft.

The present invention is capable of preventing the engagement of the nut part from being released in part of the moving range of the nut part.

DETAILED DESCRIPTION OF THE INVENTION

An embodiment of a camera including a power transmission, to which the present invention is applied, is described below.

Figure 1:
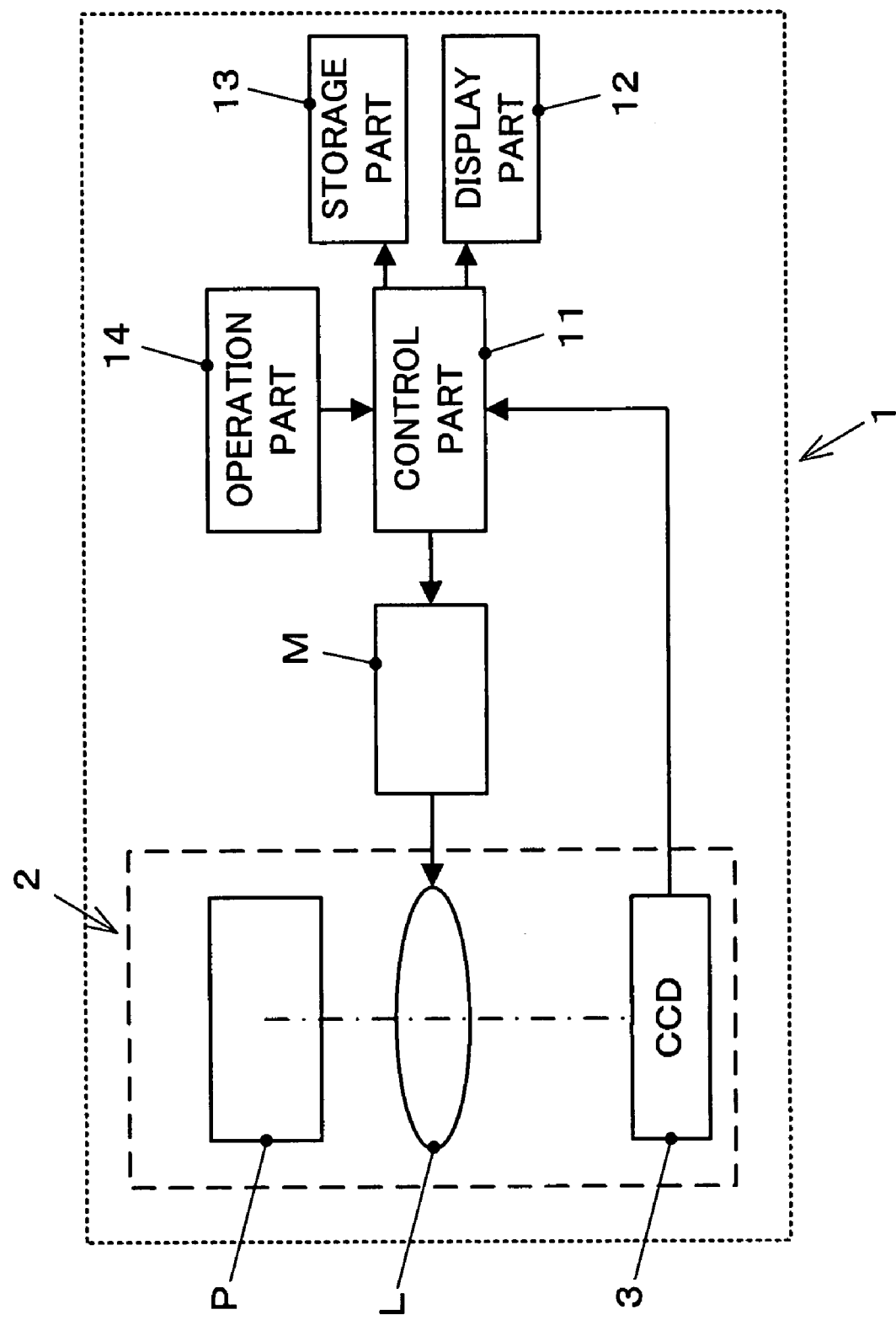
FIG. 1 is a block diagram showing the construction of a camera to which the present invention is applied.

FIG. 1 is a block diagram showing the construction of a camera 1 of the present embodiment. A lens barrel 2 is constructed of a prism P as a bent portion, lenses L, and a CCD 3. After the light from an object (not shown) enters the lens barrel 2, it is deflected 90 degrees by the prism P, and an image is then formed on the CCD 3 by the lenses L. The details of the lens barrel 2 are described later in detail with reference to FIG. 2.

The signal from the CCD 3 is inputted to a control part 11. The control part 11 is constructed of a CPU or an ASIC, and processes signals from the CCD 3. Image data processed by the control part 11 and, as needed, converted to a JPEG file or the like, are then preserved in a storage part 13. The image data processed by the control part 11 is displayed on a display part 12, such as a liquid crystal display, equipped with the camera 1.

An operation part 14 is constructed of a shutter button, a zoom button, and a cross button for setting a variety of photographing preferences. For example, when a user (an operator) pushes the shutter button of the operation part 14, the control part 11 causes a shutter (not shown) to open and close so that the CCD 3 is exposed for a predetermined time, thereby taking an object image. When the zoom button is operated, the control part 11 drives a motor (not shown) so as to shift a zoom lens in the lenses L and change the magnification of the object image to be formed on the CCD 3.

Figure 2:
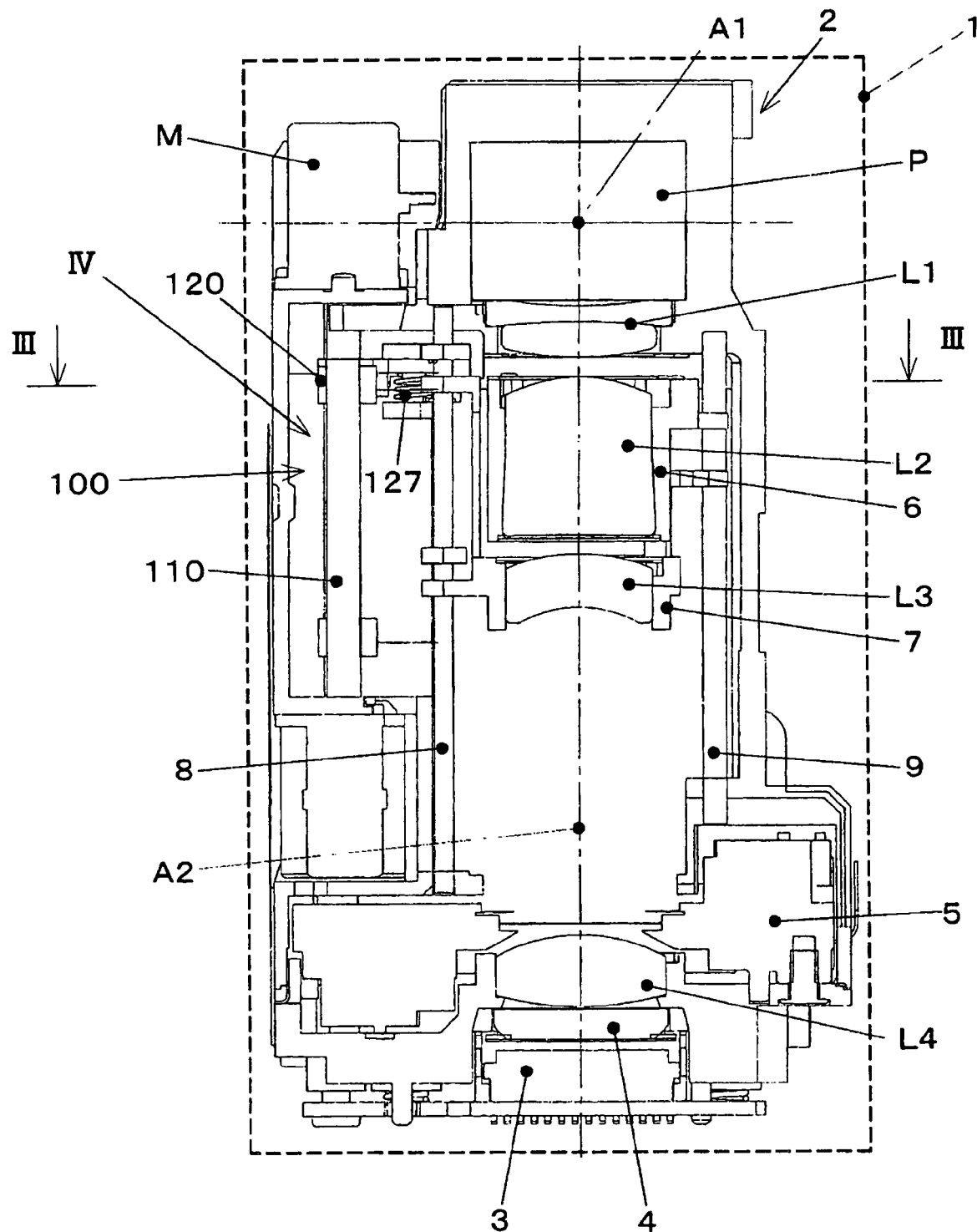
FIG. 2 is a sectional view of a lens barrel in a preferred embodiment of a camera to which the present invention is applied.

FIG. 2 is a sectional view of the lens barrel 2 of the camera 1 of the present embodiment.

The camera 1 of the present embodiment is, for example, a digital still camera of non-replaceable lens type. This camera 1 has, as an imaging optical system, a bent optical system for changing the optical axis direction.

The camera 1 accommodates the lens barrel 2 in a box-like casing.

The lens barrel 2 is provided with the prism P, a first lens unit L1, a second lens unit L2, a third lens unit L3, a fourth lens unit L4, the CCD 3, a low pass filter 4, a shutter diaphragm unit 5, a second lens unit frame 6, a third lens unit frame 7, and guide shafts 8 and 9.

The prism P is a bending portion by which the optical axis direction is changed 90 degrees, for example. An optical axis A1 adjacent to the object side of the prism P (i.e., a direction vertical to the surface of the drawing) is arranged substantially horizontal at the time of normal imaging. An optical axis A2 adjacent to the image side of the prism P is arranged substantially vertical at the time of normal imaging.

In the present specification, the term "at the time of normal imaging" means the position of the camera with a longer side direction of the screen positioned substantially horizontal when a picture image is taken by arranging an object spaced apart substantially horizontally to the camera 1.

The first lens unit L1, the second lens unit L2, the third lens unit L3, and the fourth lens unit L4 are aligned in sequence along the optical axis A2, below the prism P at the time of normal imaging.

The second lens unit L2 and the third lens unit L3 are zooming lenses for changing the magnification according to the movement in the optical axis A2 direction, and both are independently supported movably in the optical axis A2 direction.

The CCD 3 is a solid-state image sensor disposed on the exit side of the fourth lens unit L4. In the CCD 3, an imaging optical system generates an electric image output signal based on the image light of an object image to be formed on an imaging surface.

The low pass filter (LPF) 4 is disposed between the fourth lens unit L4 and the CCD 3, and prevents the occurrence of moire in the image output signal outputted from the CCD 3.

The shutter diaphragm unit 5 is disposed on the incident side of the fourth lens unit L4, and is provided with a diaphragm part that regulates the quantity of image light passing through the imaging optical system, and a shutter part for controlling the exposure time that the CCD 3 is exposed to the image light.

The second lens unit frame 6 and the third lens unit frame 7 are frames, to the internal diameter side of which the second lens unit L2 and the third lens unit L3 are fixed, respectively. The second lens unit frame 6 and the third lens unit frame 7 can be manufactured by the injection molding of a resin base material.

The second lens unit frame 6 and the third lens unit frame 7 are supported movably in the optical axis A2 direction to the main body of the lens barrel 2, respectively.

The guide shafts 8 and 9 are cylindrical shafts arranged so as to extend parallel to the optical axis A2, and guide the movements of the second lens unit frame 6 and the third lens unit frame 7 in the optical axis A2 direction.

Figure 3:
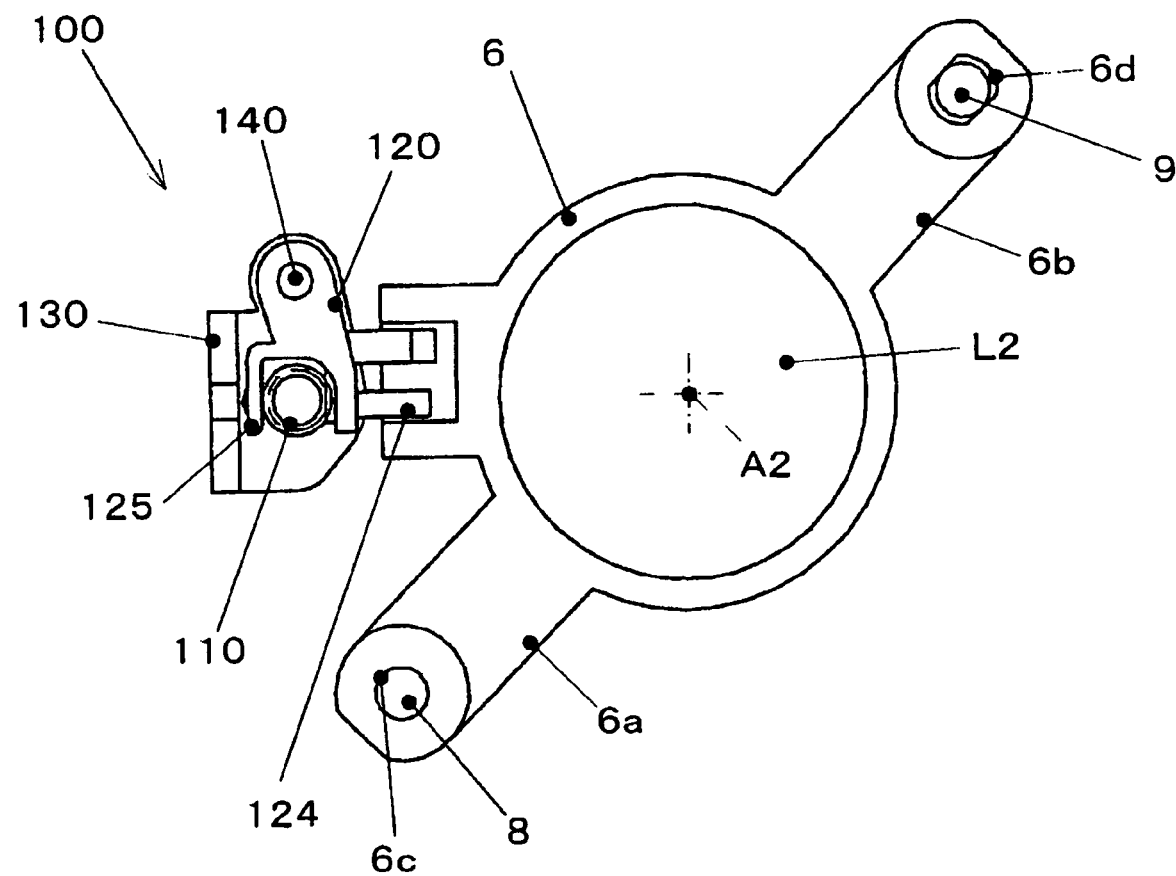
FIG. 3 is a sectional view taken along the line indicated with arrows III-III in FIG. 2.

FIG. 3 is a sectional view taken along the line indicated with arrows III-III in FIG. 2.

The guide shafts 8 and 9 are disposed on opposite sides with the second lens unit L2 interposed there between, and their respective positions are substantially symmetrical with respect to the optical axis A2. The second lens unit frame 6 is formed so as to project from its outer peripheral surface part to its external diameter, and its tip portion is provided with arm portions 6a and 6b to be engaged with the guide shafts 8 and 9, respectively. The arm portions 6a and 6b have guide holes 6c and 6d at tip portions thereof, into which the guide shafts 8 and 9 is inserted, respectively. The guide hole 6c, into which the guide shaft 8 can be inserted, is formed in the shape of approximately a complete round, the internal diameter of which is greater than the outer diameter of the guide shaft 8 by a clearance unavoidably provided for sliding. On the other hand, the guide hole 6d, into which the guide shaft 9 can be inserted, is formed in the shape of an ellipse, the longitudinal axis of which is the direction substantially parallel to a line passing through the guide shaft 8 and the guide shaft 9. This enables the guide hole 6d to absorb a radial dimensional tolerance of the second lens unit frame 6.

The third lens unit frame 7 also has the same construction as the abovementioned second lens unit frame 6.

As shown in FIG. 2, the lens barrel 2 has a motor M and a power transmission 100 that drive the second lens unit L2 in the optical axis A2 direction.

The motor M is an electric actuator such as a stepping motor. The motor M is arranged on the side part in the normal imaging, with the output axis thereof positioned substantially parallel to the optical axis A2.

The power transmission 100 transmits the output of the motor M to the second lens unit frame 6.

Figure 4:
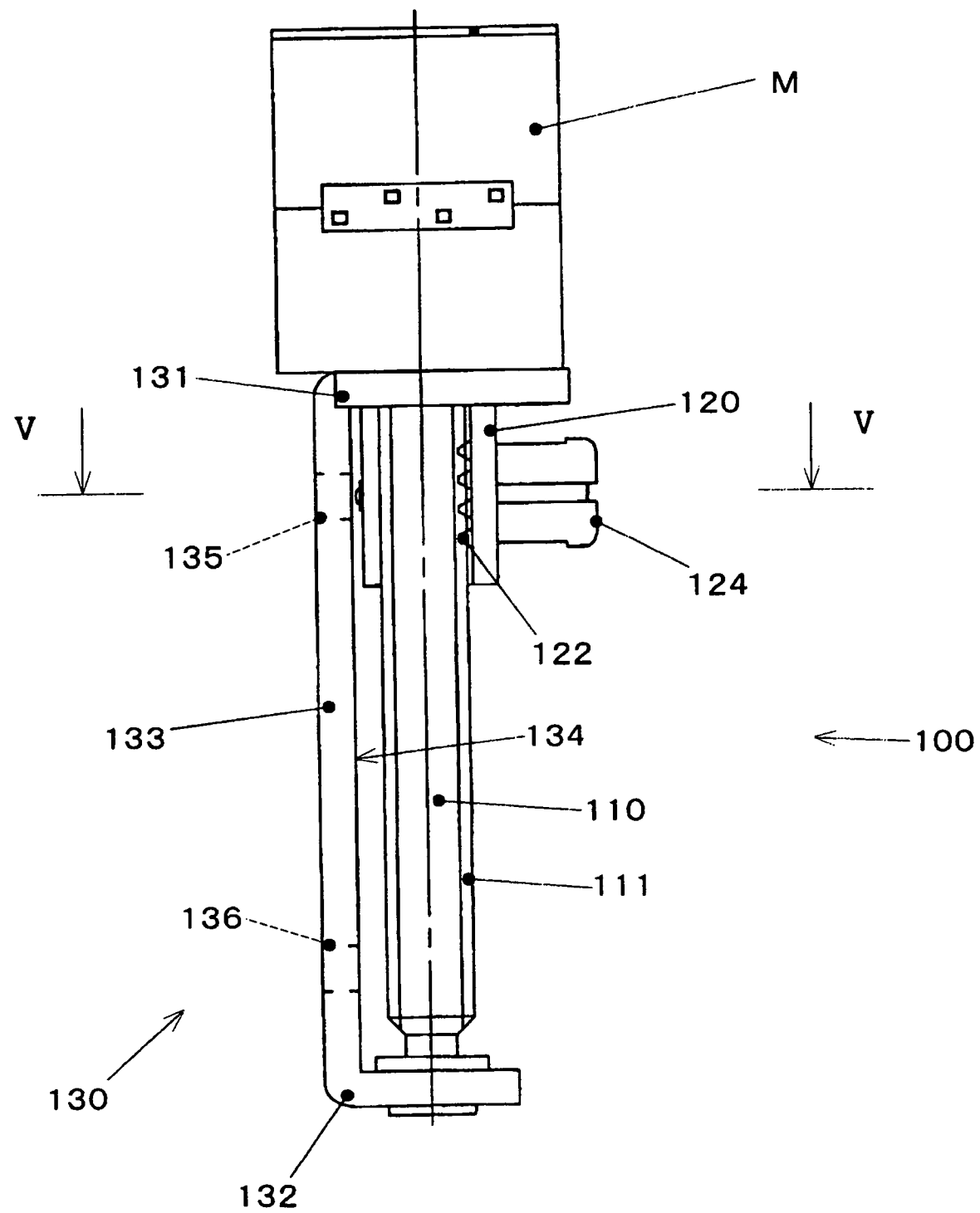
FIG. 4 is an enlarged view of the site IV in FIG. 2.
Figure 5:
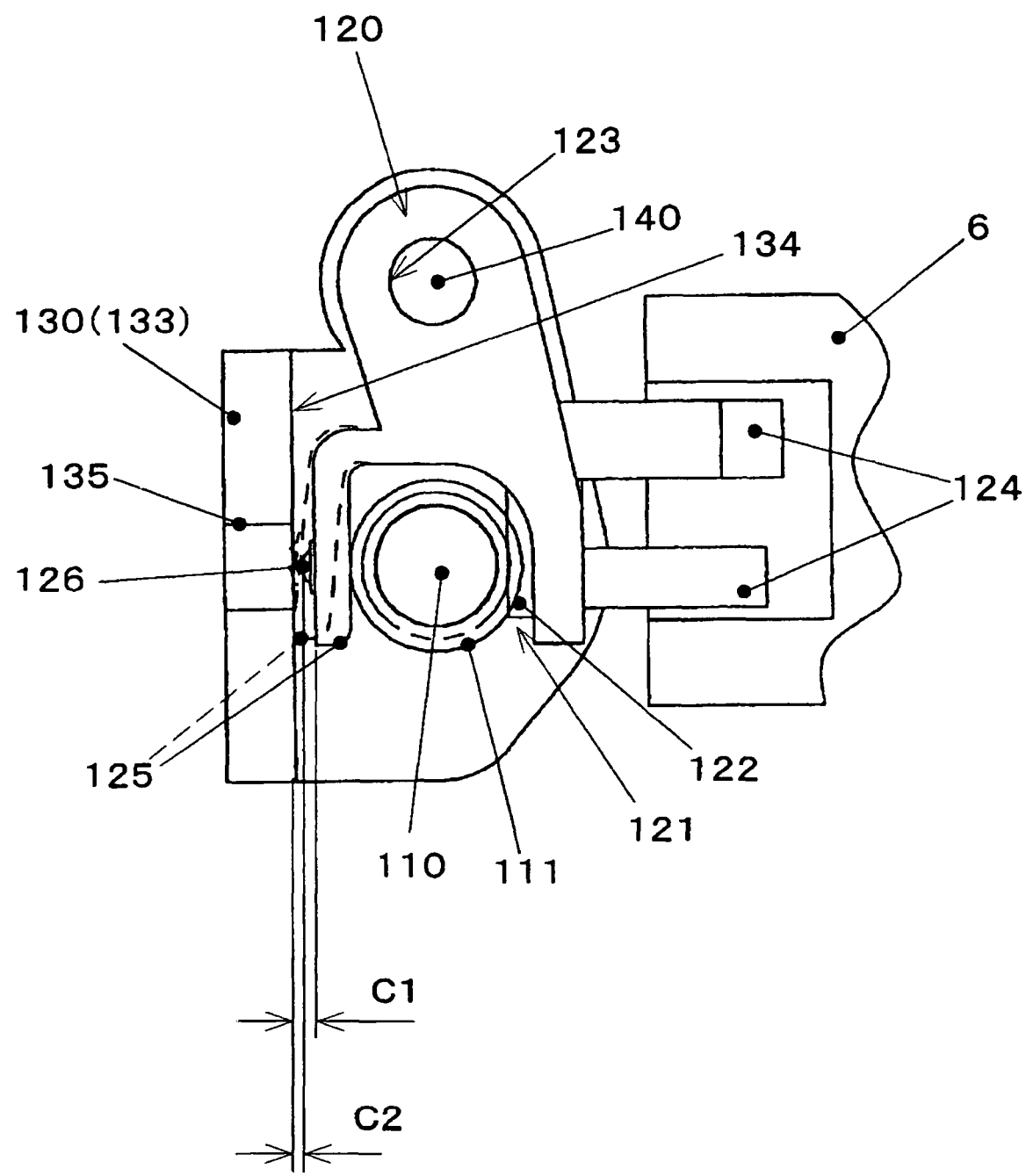
FIG. 5 is a sectional view taken along the line indicated with arrows V-V in FIG. 4.

FIG. 4 is an enlarged view of the site IV in FIG. 2. FIG. 5 is a sectional view taken along the line indicated with arrows V-V in FIG. 4.

The power transmission 100 has a drive shaft 110, a nut 120, a retaining board 130, and a guide shaft 140.

The drive shaft (motor lead shaft) 110 is a rotating shaft part connected to the output axis of the motor M, and it is also a lead screw having a threaded portion 111 at the outer peripheral surface part thereof.

The nut 120 is engaged with the threaded portion 111 of the drive shaft 110, and driven longitudinally along the drive shaft 110 (i.e., in the optical axis A2 direction) as the drive shaft 110 is rotated.

The nut 120 can be formed integrally with a material having elasticity such as resin by injection molding, for example. The nut 120 is provided with a grooved part 121, in which part of the drive shaft 110 can be pinched. A threaded portion 122 to be engaged with the threaded portion 111 is formed at one of the surface parts opposing the drive shaft 110 of the grooved part 121. The threaded portion 122 is disposed on the opposite side of the retaining board 130 with the drive shaft 110 interposed there between.

The nut 120 is further provided with a guide hole 123, an arm part 124, and a claw part 125.

The guide hole 123 is a through hole part, into which the guide shaft 140 can be inserted, and prevents the nut 120 from rotating (co-rotating) around the drive shaft 110.

The arm part 124 is a projecting portion formed so as to project on the second lens unit frame 6, and engaged with the outer peripheral surface part of the second lens unit frame 6, so that the second lens unit frame 6 can move as the nut 120 moves.

The claw part 125 is a flat portion having flexibility, which includes the surface part on the side of the internal surface of the grooved part 121 where the threaded portion 122 is not formed (i.e., the retaining board 130 side).

A projection 126 is formed on the surface part of the claw part 125 opposing the retaining board 130 described later (see FIG. 5). The projection 126 is described later in detail.

The nut 120 is biased by a spring 127 (see FIG. 2) toward one side in the optical axis A2 direction, so that the backlash with the drive shaft 110 can be regulated.

The retaining board 130 can be formed by sheet metal working, for example, and it is a member for rotatably retaining the drive shaft 110, and formed of an upper surface part 131, a lower surface part 132, and a middle part 133.

The upper surface part 131 is a flat portion disposed along the lower surface part of the motor M and fixed to the motor M.

The lower surface part 132 is provided with a bearing part for rotatably supporting the tip portion (the lower end) of the drive shaft 110, and formed in the shape of a plate substantially orthogonal in a direction longitudinal to the drive shaft 110.

The middle part 133 extends between the outer peripheral edge of the upper surface part 131 and the outer peripheral edge of the lower surface part 132, and is a flat portion arranged so as to extend vertically to the camera 1 for normal imaging.

A regulating surface part 134 that inhibits the disengagement of the nut 120 from the drive shaft 110 is disposed on the side of the middle part 133 which is opposite the drive shaft 110 and the nut 120.

Here, a clearance C1 (see FIG. 5) between the claw part 125 of the nut 120 and the regulating surface part 134 is set to be larger than the height of engagement between the threaded portion 111 and the threaded portion 122 of the drive shaft 110.

A clearance C2 between the projection 126 of the nut 120 and the regulating surface part 134 is set to be smaller than the abovementioned height of the engagement.

The middle part 133 has openings 135 and 136, which are formed in the vicinity of its upper end and its lower end, respectively. The openings 135 and 136 are formed so as to pass through from the regulating surface part 134 side of the middle part 133 to the surface part on the opposite side.

Alternatively, the openings 135 and 136 may not pass through, and they may be holes enabling the projection 126 to be inserted. In this case, the holes are required to have a depth to the degree that, by the insertion of the projection 126 into the openings 135 and 136, the spacing of the grooved part 121 can be increased to prevent meshing of the threads.

In each of FIGS. 2 to 5, the second lens unit L2 is outside the range used for controlling zoom at the time of normal zooming, and is closer to the first lens unit L1 side than the upper end thereof.

At this time, the projection 126 of the nut 120 is opposed to the opening 135.

For example, in cases where, although the second lens unit L2 has reached the end of the moving range in which it can be mechanically regulated, the drive shaft 110 is further rotated due to the malfunction of control of the motor M, in between the threaded portion 111 of the drive shaft 110 and the threaded portion 122 of the nut 120, a force is generated by the tilting of the threads, and meshing of the threads may take place.

In this case, as shown in each of FIGS. 2 to 5, in the state where the projection 126 of the nut 120 is opposed to the opening 135 of the retaining board 130, when the nut 120 is deformed, the claw part 125 can be deformed in the range of the abovementioned clearance C1 by the insertion of the projection 126 into the opening 135. This deformation increases the spacing of the grooved part 121, enabling the thread of the threaded portion 122 of the nut 120 to pass over the thread of the threaded portion 111 of the drive shaft 110. Consequently, the engagement between the nut 120 and the drive shaft 110 can be released, thus avoiding a problem such as meshing of the threads, and the like.

Next, it will be described that the state where, the second lens unit L2 is subjected to normal control in the zooming operation and the like in the abovementioned camera 1.

Figure 6:
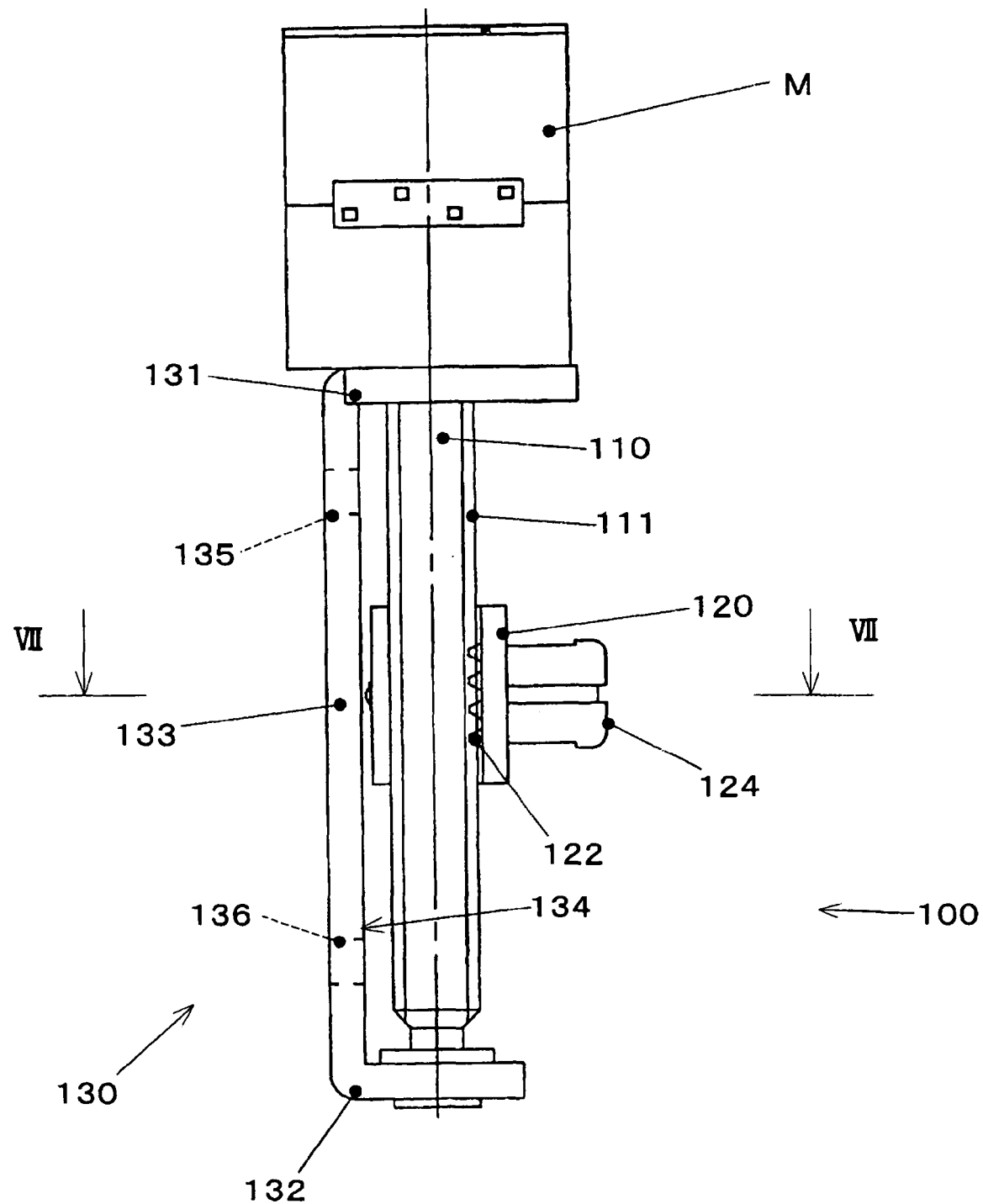
FIG. 6 is an enlarged view of a key part showing a state where the nut is in a release regulating region in the camera of FIG. 2.

FIG. 6 is an enlarged view of a key part of the camera 1 in the abovementioned state, showing the parts corresponding to FIG. 4 as described above.

Figure 7:
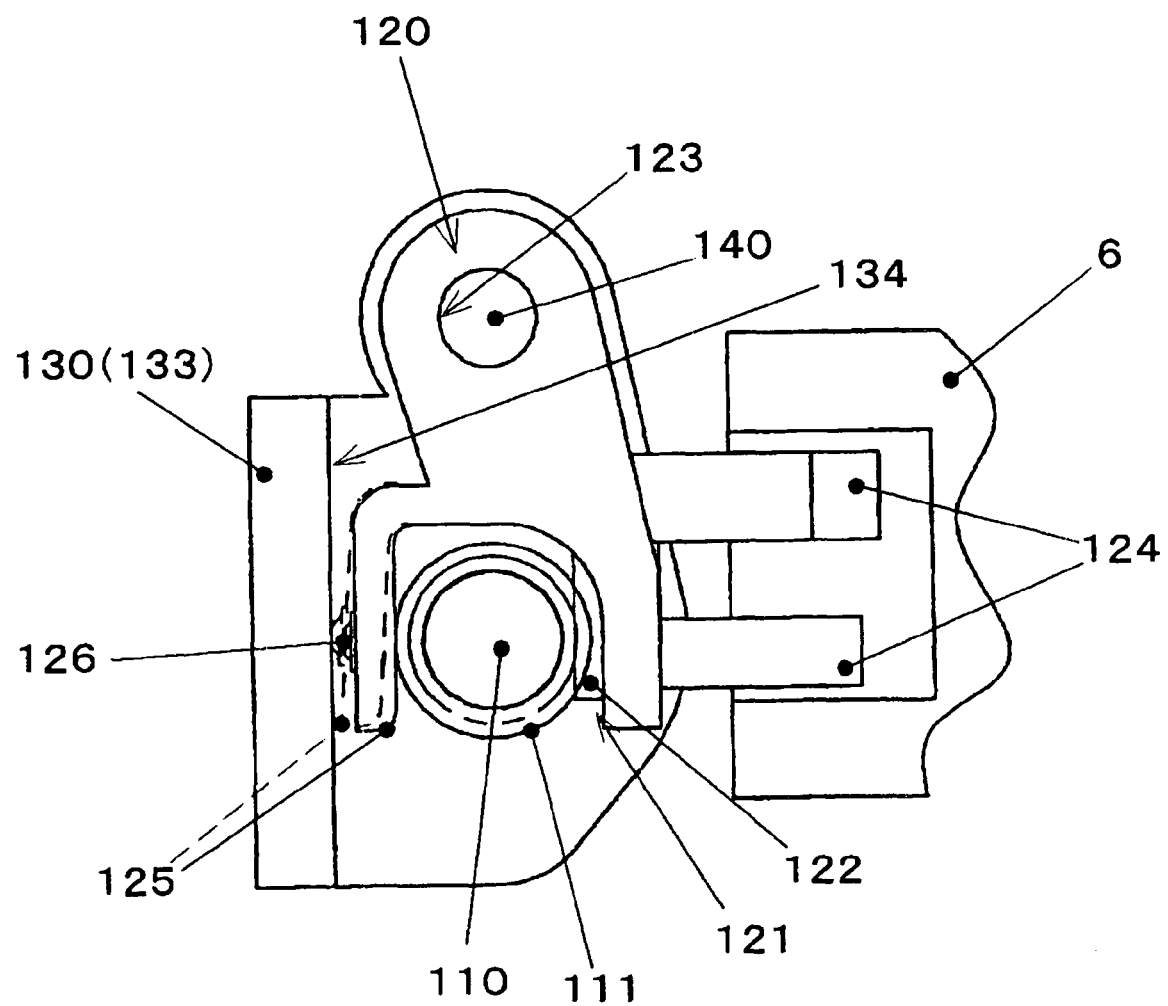
FIG. 7 is a sectional view taken along the line indicated with arrows VII-VII in FIG. 6.

FIG. 7 is a sectional view taken along the line indicated by arrows VII-VII in FIG. 6.

Thus, the range in which the nut 120 is driven by normal control is the range for which the abovementioned release function is not required, and hence it is a release regulating range where the disengagement of the nut 120 is regulated.

In this release regulating range, the projection 126 of the nut 120 is arranged at such a position as not to oppose to the openings 135 and 136 of the retaining board 130, and is opposed to the regulating surface part 134 with the abovementioned clearance C2 interposed there between.

In this state, for example, when the camera 1 is put on a table, holding the optical axis in a substantially vertical position, a force to shift the nut 120 in a direction longitudinal to the drive shaft 110 can be developed by the inertia force exerted on the second lens unit L2 and the second lens unit frame 6, due to the shock caused when the camera 1 is put on the table. By this inertia force, the nut 120 attempts to shift downward, and the grooved part 121 attempts to deform in a direction in which it is opened.

However, in the release regulating range, even if the nut 120 begins to deform, the projection 126 and the regulating surface part 135 interfere with each other, so that the grooved part 121 can be opened only by the width corresponding to the clearance C2. Therefore, the threaded portion 122 of the nut 120 cannot pass over the threaded portion 111 of the drive shaft 110, thereby preventing the disengagement of the nut 120 from the drive shaft 110.

Finally, it will be described that a state in which the second lens unit L2 is beyond the normal control range, and is shifted further downward than the lower end thereof in the abovementioned camera 1.

Figure 8:
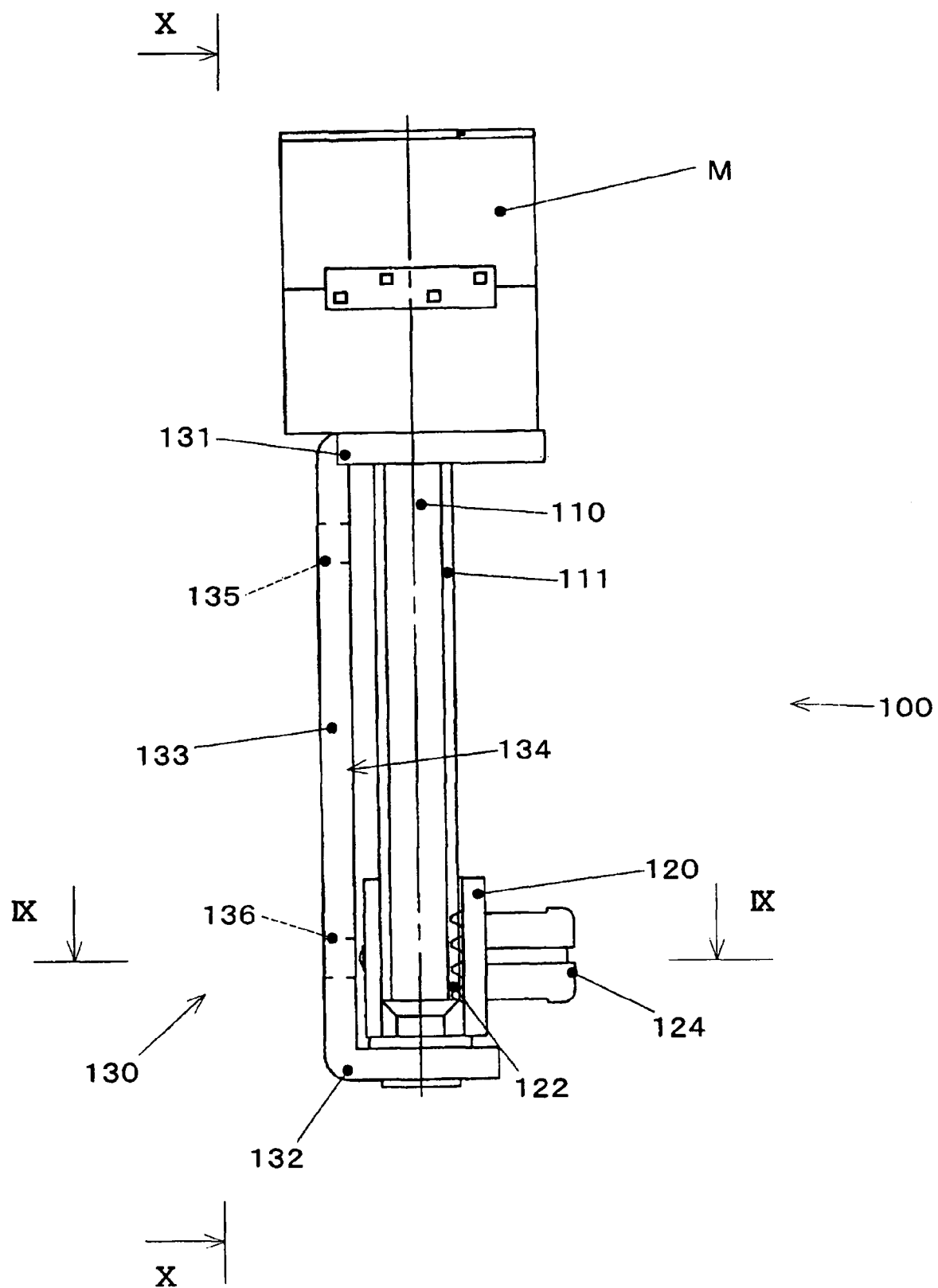
FIG. 8 is an enlarged view of a key part showing a state where the nut is in a lower releasable region in the camera of FIG. 2.

FIG. 8 is an enlarged view of a key part of the camera in the abovementioned state, which shows parts corresponding to FIG. 4 as described above.

Figure 9:
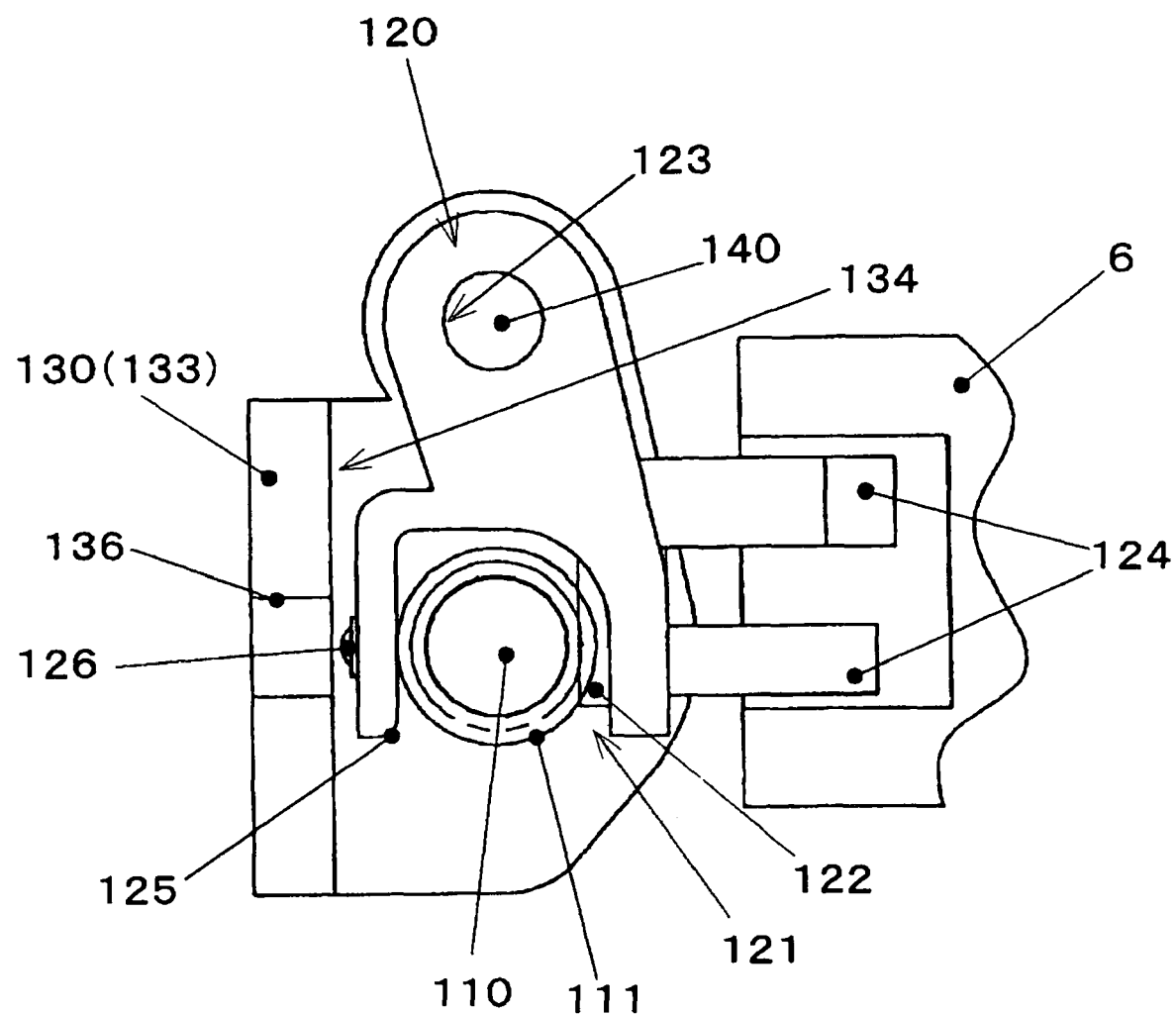
FIG. 9 is a sectional view taken along the line indicated with arrows IX-IX in FIG. 8.

FIG. 9 is a sectional view taken along the line indicated with arrows IX-IX in FIG. 8.

Figure 10:
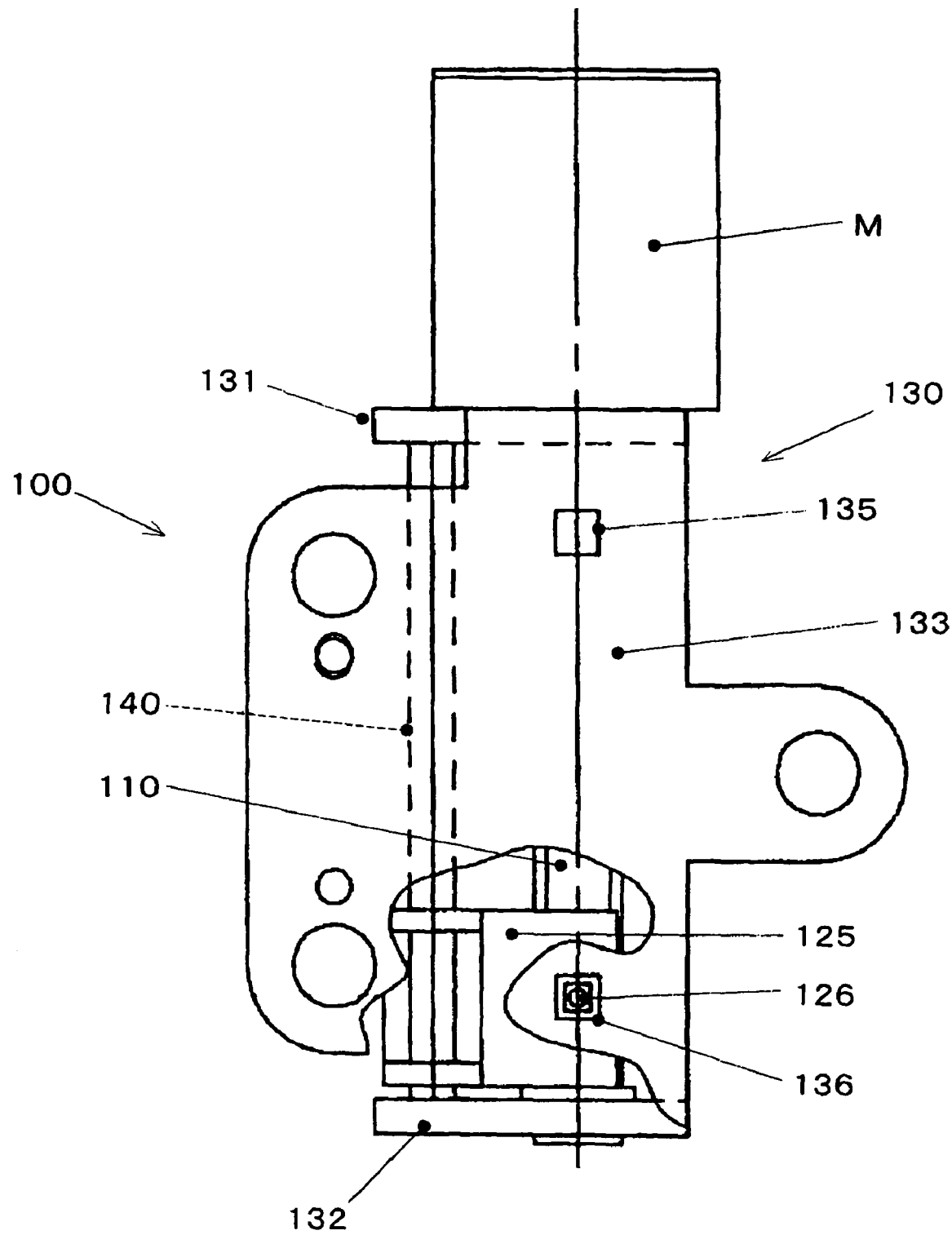
FIG. 10 is a sectional view taken along the line indicated with arrows X-X in FIG. 8.

FIG. 10 is a sectional view taken along the line indicated with arrows X-X in FIG. 8.

In the states as shown in each of FIGS. 8 to 10, the projection 126 of the nut 120 is opposed to the opening 136 of the retaining board 130. Consequently, as in the case with the states in FIGS. 2 to 5, when a force beyond a predetermined falling force is exerted between the drive shaft 110 and the nut 120, the projection 126 can insert into the opening 136 so that the nut 120 can deform elastically, thereby releasing the engagement with the drive shaft 110.

Thus, the present embodiment achieves the object of providing a power transmission capable of regulating the release of the engagement between the nut part and the threaded part, and the camera provided with the power transmission, by arranging, in a range of regulating the release of the engagement between the nut and the threaded part, a regulating surface part for regulating the amount of deformation of the nut when it is deformed in its opening direction, and by forming an opening at the regulating surface part in a region enabling the release of the engagement.

Concretely speaking, the present embodiment is capable of producing the following effects.

(1) As shown in FIGS. 6 and 7, in the range where the release of engagement between the drive shaft 110 and the nut 120 should be regulated (the release regulating region), the regulating surface part 134, which, when the nut 120 is deformed in a direction to open the grooved part 121, interferes with the projection 126 and regulates the deformation is provided. Therefore, the release of the engagement can be regulated by controlling the amount of opening of the grooved part 121 to no more than the thread overlap of the threaded portions 111 and 122, thereby preventing the threads of the threaded portions 111 and 122 from passing over each other.

(2) On the other hand, as shown in FIGS. 2 to 5 and FIGS. 8 to 10, in the region enabling the release of engagement between the drive shaft 110 and the nut 120 (the releasable region), the retaining board 130 is provided with the openings 135 and 136, into which the projection 126 of the nut 120 can be inserted. This increases the deformable amount of the nut 120, enabling the threads of the threaded portions 111 and 122 to pass over each other. Therefore, the release of the engagement can be executed to protect the power transmission 100 from an excessive force.

(3) The regulating surface part 134 is formed integrally with the retaining board 130 retaining the drive shaft 110. This avoids an increase in the number of parts, enabling the construction of the power transmission 100 to be simplified.

(4) The nut 120 is provided with the projection 126 opposing the regulating surface part 134. Hence, fine adjustment to the clearance can be made easily by changing a part of a metal mold for forming the nut 120 so as to adjust the height and the shape of the projection 126.

(Modifications)

Many modifications and variations of the present invention are possible without limiting the foregoing embodiment, and they are also within the scope of the appended claims or the equivalents thereof.

(1) Although the camera of the foregoing embodiment is, for example, a digital still camera of non-replaceable lens type provided with the bent optical system, without limiting this, the present invention is also applicable to other types of cameras, lens barrels and the like. For example, it is also possible to apply to cameras provided with an optical system other than the bent optical system, movie cameras, and film cameras, wherein the cameras also include those incorporated in other equipment such as mobile telephones and portable information terminals.

The power transmission of the present invention is also applicable to purposes other than the cameras, particularly suitable for equipment that may be subjected to shock, such as portable types of equipment and on-vehicle equipment.

(2) The construction of the power transmission can be changed properly, without limiting that described in the foregoing embodiment. For example, though the release regulating part is formed at a part of the retaining board supporting the rotation shaft part in the foregoing embodiment, it may be integrated with a component other than the retaining board, or a dedicated member constructed separately may be used. Although in the foregoing embodiment, the openings are formed at the surface part and continue to the regulating surface part in the releasable region, the openings may be replaced with recesses not passing through. Alternatively, such a surface part itself may not be present in the release regulating region.

(3) Although the foregoing embodiment describes one in which power is transmitted from the rotation shaft side to the nut part side, and rotary motion is converted to translatory motion, the power may conversely be transmitted from the nut part side to the rotation shaft side so that the translatory motion can be converted to the rotary motion.

What is claimed is:

1. A power transmission, comprising:
   a rotation shaft having a thread formed on a periphery thereof;
   a nut member including a resilient part that straddles the rotation shaft and has a thread engaged with the thread of the rotation shaft, and the nut member moving synchronously with the rotation of the rotation shaft; and
   a guide member including a regulating part and a regulation releasing part, wherein
   the regulating part restricts the width of the resilient part from expanding so as to allow the nut member to move when the regulating part is in contact with the resilient part,
   the regulation releasing part allows the width of the resilient part to expand such that the nut member and the rotation shaft disengage from each other under a predetermined condition,
   the regulating part and the regulation releasing part are configured to lie at different positions in a direction parallel with the rotation shaft, and
   the nut member moves in a first direction and disengages from the rotation shaft at the regulation releasing part when the rotation shaft rotates in a first rotational direction and moves in a second direction opposite to the first direction when the rotation shaft rotates in a second rotational direction opposite to the first rotational direction.

2. The power transmission according to claim 1, wherein the predetermined condition includes a force of a predetermined value acting between the thread of the resilient part and the thread of the rotation shaft.

3. The power transmission according to claim 1, wherein the guide member is arranged substantially parallel to the rotation shaft.

4. The power transmission according to claim 3, wherein the predetermined condition includes a force of a predetermined value acting between the thread of the resilient part and the thread of the rotation shaft.

5. The power transmission according to claim 3, wherein
   the regulating part is positioned at a specific portion in the guide member such that the nut member and the rotation shaft remain engaged with each other and the regulation releasing part is positioned adjacent to an end of the specific portion of the guide member.

6. The power transmission according to claim 3, wherein
   the regulating part is a surface opposed to the nut member, and
   the regulation releasing part is one of a recess and an opening opposed to the nut member.

7. The power transmission according to claim 6, wherein the resilient part has a projection smaller than the recess or the opening at a position opposed to the guide member.

8. The power transmission according to claim 7, wherein
   the regulating part is positioned at a specific portion in the guide member such that the nut member and the rotation shaft remain engaged with each other and the regulation releasing part is positioned adjacent to an end of the specific portion of the guide member.

9. The power transmission according to claim 1, further comprising an actuator that drives the rotation shaft to rotate.

10. The power transmission according to claim 1, wherein the guide member is disposed away from the resilient part by a predetermined distance.

11. The power transmission according to claim 1, wherein
    the resilient part includes a projection,
    a first distance between the guide member and the resilient part is configured to be greater than a depth of engagement between the nut member and the rotation shaft, and
    a second distance between the guide member and the projection is smaller than the depth of engagement between the nut member and the rotation shaft.

12. A camera comprising:
    a power transmission having a rotation shaft having a thread on a periphery thereof;
    a nut member including a resilient part that straddles the rotation shaft and has a thread engaged with the thread of the rotation shaft, the nut member moving synchronously with the rotation of the rotation shaft;
    a guide member including a regulating part and a regulation releasing part;
    an actuator to rotate the rotation shaft of the power transmission; and
    a movable lens connected to the nut member of the power transmission, wherein
    the regulating part restricts the width of the resilient part from expanding so as to allow the nut member to move when the regulating part is in contact with the resilient part,
    the regulation releasing part allows the width of the resilient part to expand such that the nut member and the rotation shaft disengage from each other under a predetermined condition, and
    the nut member moves in a first direction and disengages from the rotation shaft at the regulation releasing part when the rotation shaft rotates in a first rotational direction and moves in a second direction opposite to the first direction when the rotation shaft rotates in a second rotational direction opposite to the first rotational direction.

13. The camera according to claim 12, wherein the predetermined condition includes a force of a predetermined value acting between the thread of the resilient part and the thread of the rotation shaft.

14. The camera according to claim 12, wherein
    the guide member is substantially parallel to the rotation shaft,
    the regulating part is positioned at a specific portion in the guide member such that the nut member and the rotation shaft remain engaged with each other, and
    the regulation releasing part is positioned adjacent to an end of the specific portion of the guide member.

15. The camera according to claim 14, wherein
    the regulating part is a surface opposed to the nut member, and
    the regulation releasing part is one of a recess and an opening opposed to the nut member.

16. The camera according to claim 15, wherein the predetermined condition includes a force of a predetermined value acting between the thread of the resilient part and the thread of the rotation shaft.

17. The camera according to claim 12, wherein the guide member is arranged substantially parallel to the rotation shaft.

18. The camera according to claim 17, wherein the predetermined condition includes a force of a predetermined value acting between the thread of the resilient part and the thread of the rotation shaft.

19. The camera according to claim 17, wherein
    the regulating part is positioned at a specific portion in the guide member such that the nut member and the rotation shaft remain engaged with each other and the regulation releasing part is positioned adjacent to an end of the specific portion of the guide member.

20. The camera according to claim 17, wherein
the regulating part is a surface opposed to the nut member, and
the regulation releasing part is one of a recess and an opening opposed to the nut member.

21. The camera according to claim 20, wherein the resilient part has a projection smaller than the recess or the opening at a position opposed to the guide member.

22. The camera according to claim 21, wherein
the regulating part is positioned at a specific portion in the guide member such that the nut member and the rotation shaft remain engaged with each other and the regulation releasing part is positioned adjacent to an end of the specific portion of the guide member.

* * * * *